(12) United States Patent
Jo et al.

(10) Patent No.: US 12,155,783 B2
(45) Date of Patent: Nov. 26, 2024

(54) MOBILE TERMINAL HAVING A SLIDE BAR DISPOSED BETWEEN A FIRST SIDE SURFACE AND A SECOND SIDE SURFACE

(71) Applicant: LG ELECTRONICS INC., Seoul (KR)

(72) Inventors: Junghyun Jo, Seoul (KR); Insu Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 432 days.

(21) Appl. No.: 17/628,016

(22) PCT Filed: Aug. 2, 2019

(86) PCT No.: PCT/KR2019/009670
§ 371 (c)(1),
(2) Date: Jan. 18, 2022

(87) PCT Pub. No.: WO2021/025181
PCT Pub. Date: Feb. 11, 2021

(65) Prior Publication Data
US 2022/0263932 A1     Aug. 18, 2022

(51) Int. Cl.
*H04M 1/02* (2006.01)
*G06F 1/16* (2006.01)

(52) U.S. Cl.
CPC ........ *H04M 1/0237* (2013.01); *G06F 1/1624* (2013.01); *G06F 1/1652* (2013.01); *G06F 1/1681* (2013.01); *H04M 1/0216* (2013.01); *H04M 1/0268* (2013.01); *H04M 2201/38* (2013.01)

(58) Field of Classification Search
CPC .......... G01N 2201/0225; G06F 1/1624; G06F 1/1652; G06F 1/1681; G06F 2203/04102; H04M 1/0216; H04M 1/0235–0239; H04M 1/0268; H04M 2201/38; H04N 1/00533
See application file for complete search history.

(56) References Cited

U.S. PATENT DOCUMENTS

2017/0123536 A1    5/2017   Aurongzeb et al.
2019/0141849 A1 *  5/2019   Xu .......................... G09F 9/301

FOREIGN PATENT DOCUMENTS

CN    101009987 A  *  8/2007
CN    101036176        9/2007
EP    1793568          6/2007
(Continued)

OTHER PUBLICATIONS

Translation of KR20100103965A printed from Google Patents on Jul. 15, 2024. (Year: 2024).*
(Continued)

*Primary Examiner* — Ronald Eisner
(74) *Attorney, Agent, or Firm* — LEE, HONG, DEGERMAN, KANG & WAIMEY

(57) ABSTRACT

A mobile terminal comprises: a first frame including a first side surface; a second frame which can slide from the first frame in a first direction or a second direction that is opposite to the first direction, and which includes a second side surface that faces the first side surface; and a slide bar which is located between the first side surface and the second side surface and which extends in the first direction.

15 Claims, 15 Drawing Sheets

(56) References Cited

FOREIGN PATENT DOCUMENTS

| | | | |
|---|---|---|---|
| KR | 20100103965 A | * | 9/2010 |
| KR | 10-2016-0097035 | | 8/2016 |
| KR | 10-2017-0025520 | | 3/2017 |
| KR | 10-2019-0001389 | | 1/2019 |
| KR | 10-2019-0086305 | | 7/2019 |
| WO | 2019-009542 | | 1/2019 |

OTHER PUBLICATIONS

Translation of CN101009987B printed from Google Patents on Jul. 15, 2024. (Year: 2024).*
European Patent Office Application Serial No. 19940739.6, extended Search Report dated Mar. 27, 2023, 9 pages.
PCT International Application No. PCT/KR2019/009670, International Search Report dated May 1, 2020, 11 pages.

* cited by examiner (a)

(b)

(a)  (b)

(a)

(b)

(a)

(b)

(a)

(b)

(a)

(b)

(a)

(b)

(a)

(b)

(a)

(b)

MOBILE TERMINAL HAVING A SLIDE BAR DISPOSED BETWEEN A FIRST SIDE SURFACE AND A SECOND SIDE SURFACE

CROSS-REFERENCE TO RELATED APPLICATIONS

This application is the National Stage filing under 35 U.S.C. 371 of International Application No. PCT/KR2019/009670, filed on Aug. 2, 2019, the contents of which are hereby incorporated by reference herein their entirety.

TECHNICAL FIELD

The present disclosure relates to a mobile terminal, and more particularly to a mobile terminal having a flexible display.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with an ubiquitous computing environment. In other words, the display device has evolved into a smart device that enables connectivity to a network and continuous computing.

Recently, a flexible display, which has sufficient elasticity, and thus, be able to be deformed largely, has been developed. A size of the mobile terminal may be varied using a deforming property of the flexible display. Preferably, the mobile terminal having a flexible structure should be designed to be stably changed in structure, and a support structure of the flexible display unit becomes problematic.

DISCLOSURE

Technical Problem

An object of the present disclosure is to provide a mobile terminal having a structure for assisting side movement.

Technical Solutions

In accordance with an aspect of the present disclosure, a mobile terminal may include a first frame having a first side surface; a second frame configured to slidably move in a first direction with respect to the first frame or in a second direction opposite to the first direction, and including a second side surface facing the first side surface; and a slide bar disposed between the first side surface and the second side surface, and extending in the first direction. In a first state where the first frame and the second frame overlap each other, the second frame transitions to a second state by moving in the first direction, and in a second state, the second frame transitions to a first state by moving in the second direction.

The mobile terminal may further include a first groove formed at the first side surface; and a second groove formed at the second side surface while facing the first groove, wherein slide bar is inserted into a rail formed by the first groove and the second groove.

The shape of the first groove may be symmetrical to a shape of the second groove.

A cross-section of the slide bar may be formed in a circular shape, and a cross-section of the rail may be formed in a square shape.

One pair of the first side surface and the second side surface may be provided on both sides of a third direction perpendicular to the first direction.

The first side surface may be disposed more outward than the second side. The mobile terminal may further include a rail cap configured to cover a first-directional end portion of the rail by coupling to the first frame.

The length of the slide bar may be shorter than the length of a first direction in which the first frame and the second frame overlap each other in the second state.

The mobile terminal may further include a link unit disposed between the first frame and the second frame, wherein the link unit includes: a first link, one side of which is rotatably coupled to the first frame; a second link, one side of which is rotatably coupled to the second frame; and a hinge coupled to the other side of the first link and the other side of the second link, and configured to adjust an angle between the first link and the second link, wherein the link unit allows the angle between the first link and the second link to vary depending on movement of the second frame.

The link unit may be constructed such that, in the first state, the first link and the second link may be arranged parallel to each other in a third direction perpendicular to the first direction.

The link unit may be disposed at an end portion of the third direction; and the link unit may be arranged so that an angle between the first link and the second link is set to 180°.

The hinge may further include a first hinge shaft configured to penetrate the other side of the first link; a second hinge shaft configured to penetrate the other side of the second link; and one pair of elastic protrusions formed to protrude from the first hinge shaft and the second hinge shaft at positions spaced apart from each other by a predetermined distance, wherein the one pair of elastic protrusions are in contact with the first link and the second link in the second state.

The angle between the first link and the second link may be less than 180° in the second state.

The other side of the first link and the other side of the second link may be overlapped in a thickness direction. The hinge may include a hinge shaft configured to penetrate the other side of the first link and the other side of the second link; a compression spring disposed at the other side of the second link, and configured to apply force in a direction of the hinge shaft; and a cam member disposed at an end portion of the compression spring, and configured to include a first inclined surface formed on a surface facing the overlapped first link, wherein another end of the first link includes a second inclined surface corresponding to the first inclined surface.

When the compression spring transitions from the first state to the second state or transitions from the second state to the first state, the compression spring may be compressed and expanded.

The first inclined surface and the second inclined surface may be horizontally symmetrical to each other with respect to a central line passing through the hinge shaft.

In accordance with another aspect of the present disclosure, a mobile terminal may include a first frame having a first side surface; a second frame configured to slidably move in a first direction with respect to the first frame, and including a second side surface facing the first side surface; and a link unit disposed between the first frame and the second frame. The link unit includes: a first link, one side of which is rotatably coupled to the first frame; a second link, one side of which is rotatably coupled to the second frame; and a hinge coupled to the other side of the first link and the other side of the second link, and configured to adjust an angle between the first link and the second link. The link unit allows the angle between the first link and the second link to vary depending on movement of the second frame.

Advantageous Effects

As is apparent from the above description, the mobile terminal according to the embodiments of the present disclosure can easily switch between a first state and a second state by reducing frictional force between a first frame and a second frame through a simple slide structure.

In addition, the mobile terminal according to the embodiments of the present disclosure can support a flexible display unit extended through a link unit.

In addition, the first link unit may prevent the inside of the mobile terminal from being exposed in a second state. The second link unit may include an elastic member so that a state transition of the mobile terminal can be semi-automatically performed. Further scope of applicability of the present disclosure will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
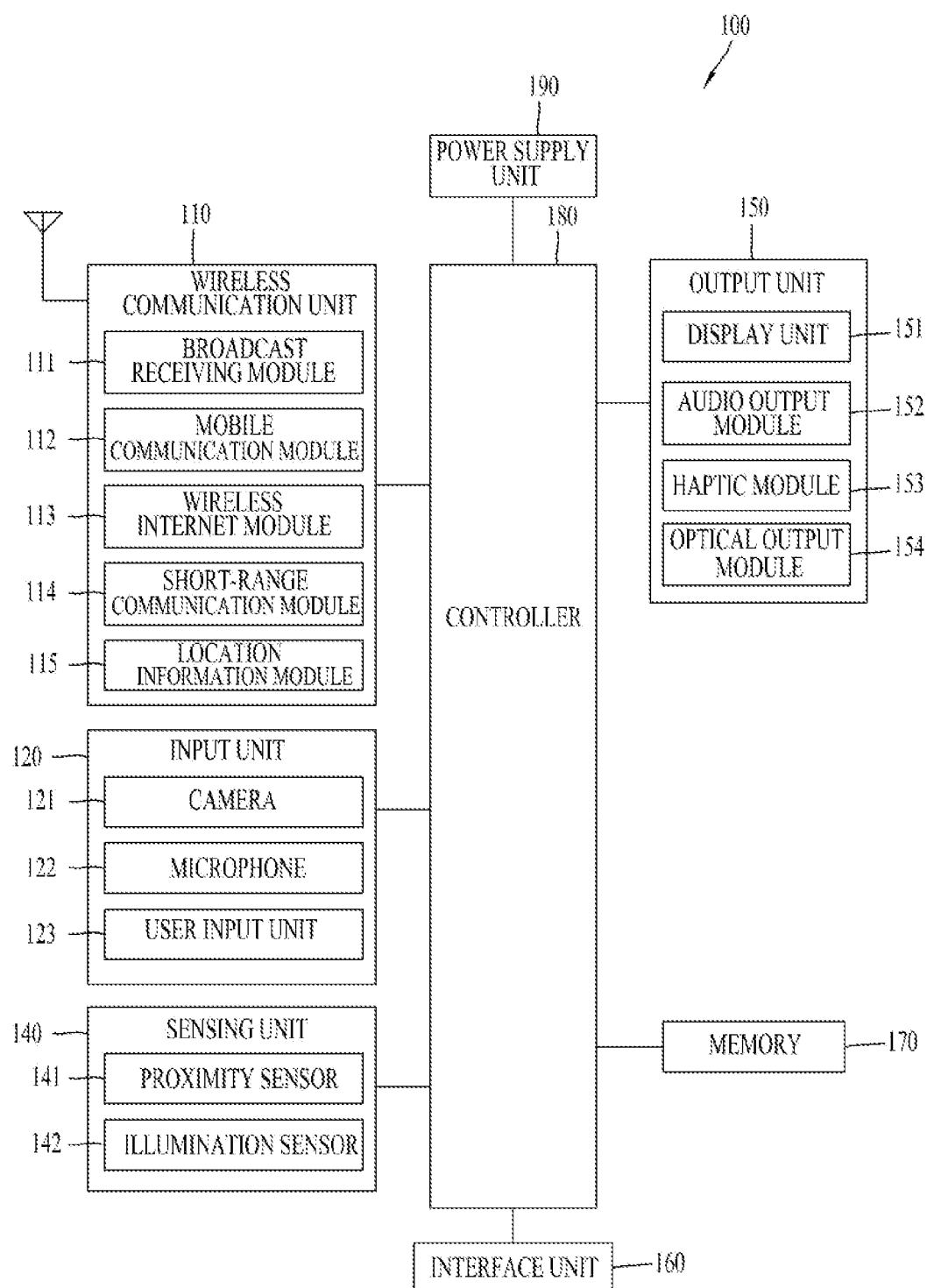
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in FIG. 1A is not a requirement, and that greater or fewer components may alternatively be implemented than the components listed above.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (WI-FI), WI-FI Direct, Digital Living Network Alliance (DLNA), Wireless Broadband (WiBro), Worldwide Interoperability for Microwave Access (WiMAX), High Speed Downlink Packet Access (HSDP A), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate shortrange communications. Suitable technologies for implementing such short-range communications include BLUETOOTH™, Radio Frequency IDentification (RFID), Infrared Data Association (IrDA), Ultra-WideBand (UWB), ZIGBEE, Near Field Communication (NFC), Wireless-Fidelity (WI-FI), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed as a user's control command.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170

Figure 2:
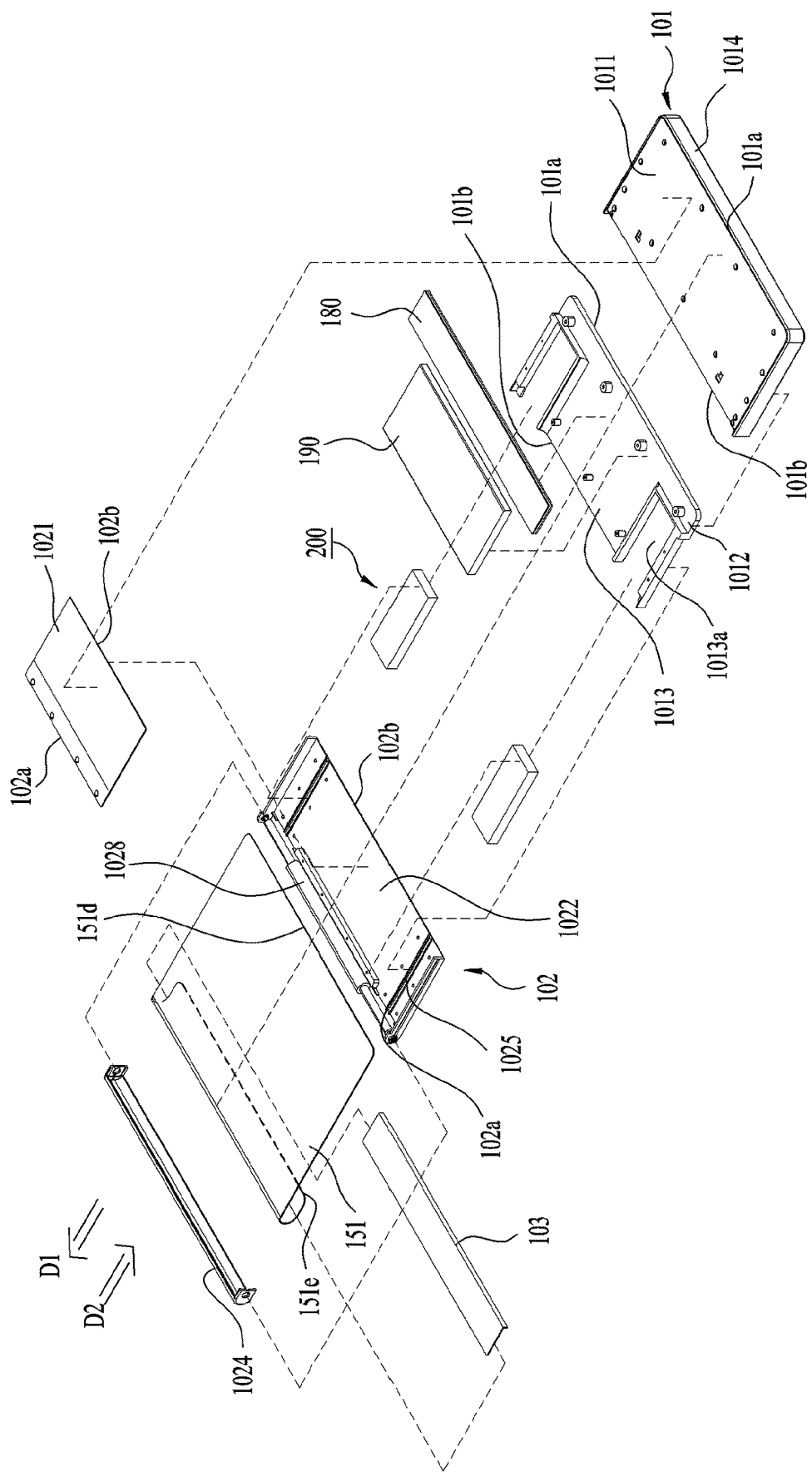
FIG. 2 is an exploded perspective view of a mobile terminal according to one embodiment.
Figure 3:
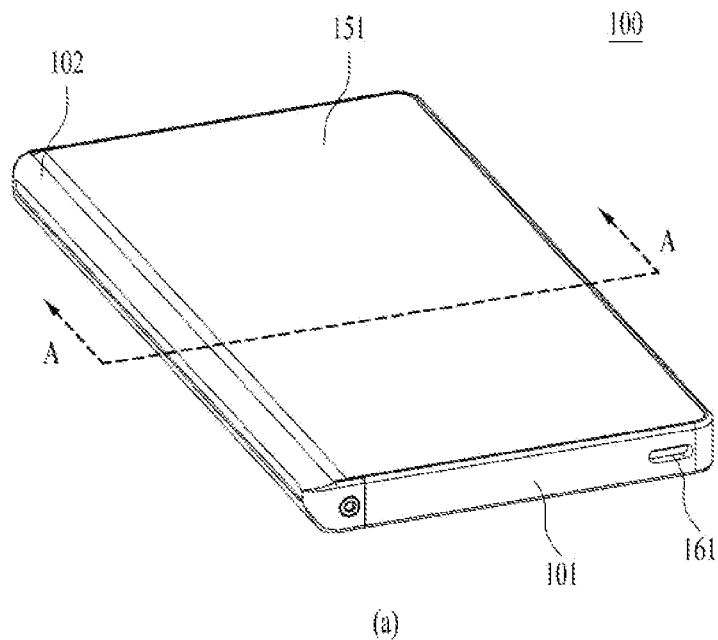
FIG. 3 shows perspective views respectively illustrating a first state and a second state viewed from one side of a mobile terminal according to one embodiment.
Figure 3:
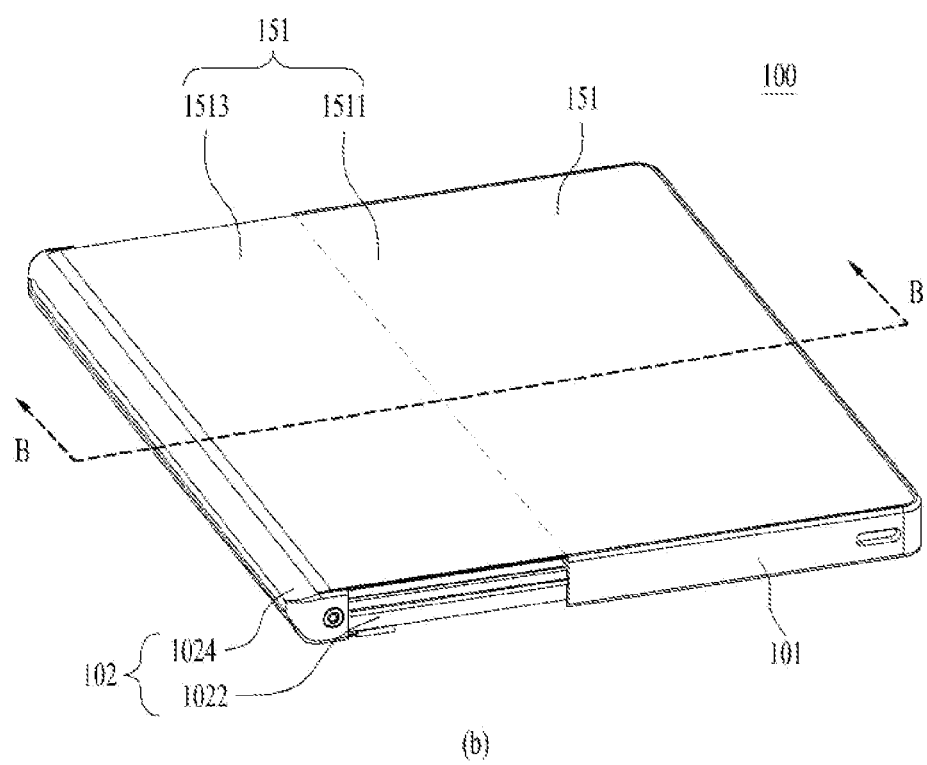
Figure 4:
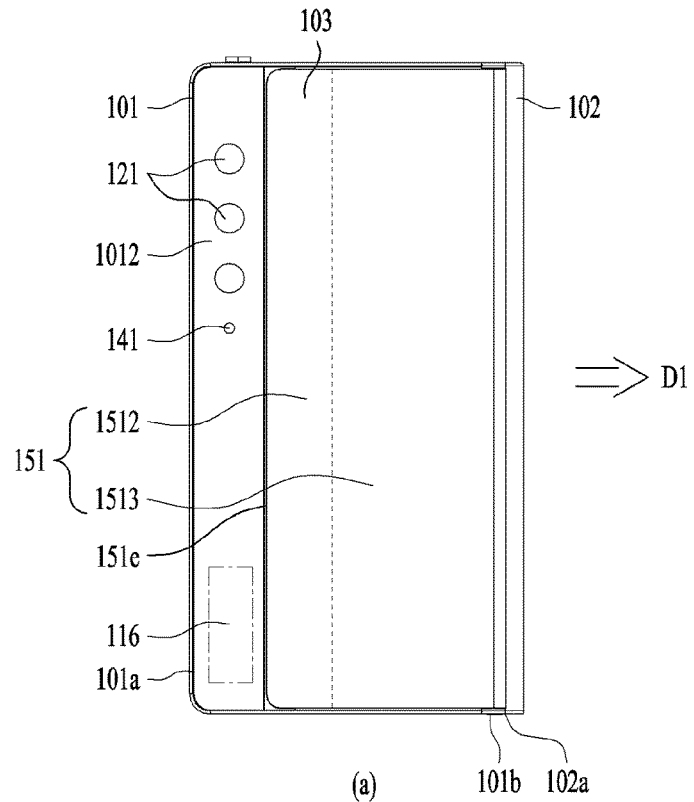
FIG. 4 shows rear face views respectively illustrating a first state and a second state of a mobile terminal according to one embodiment.
Figure 4:
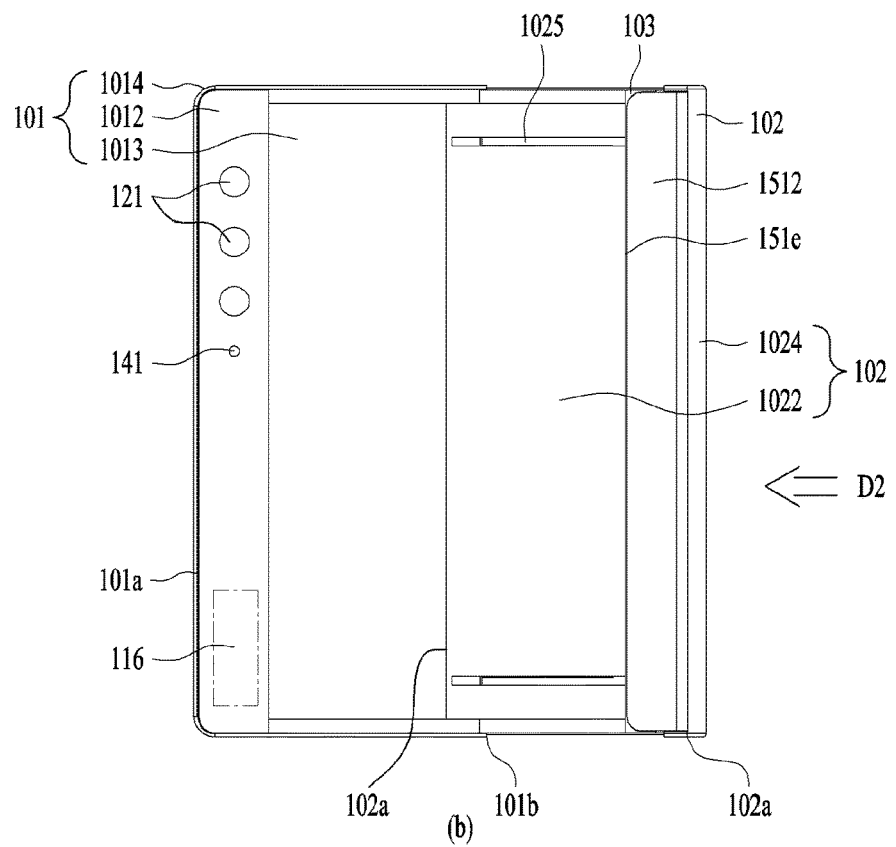
Figure 5:
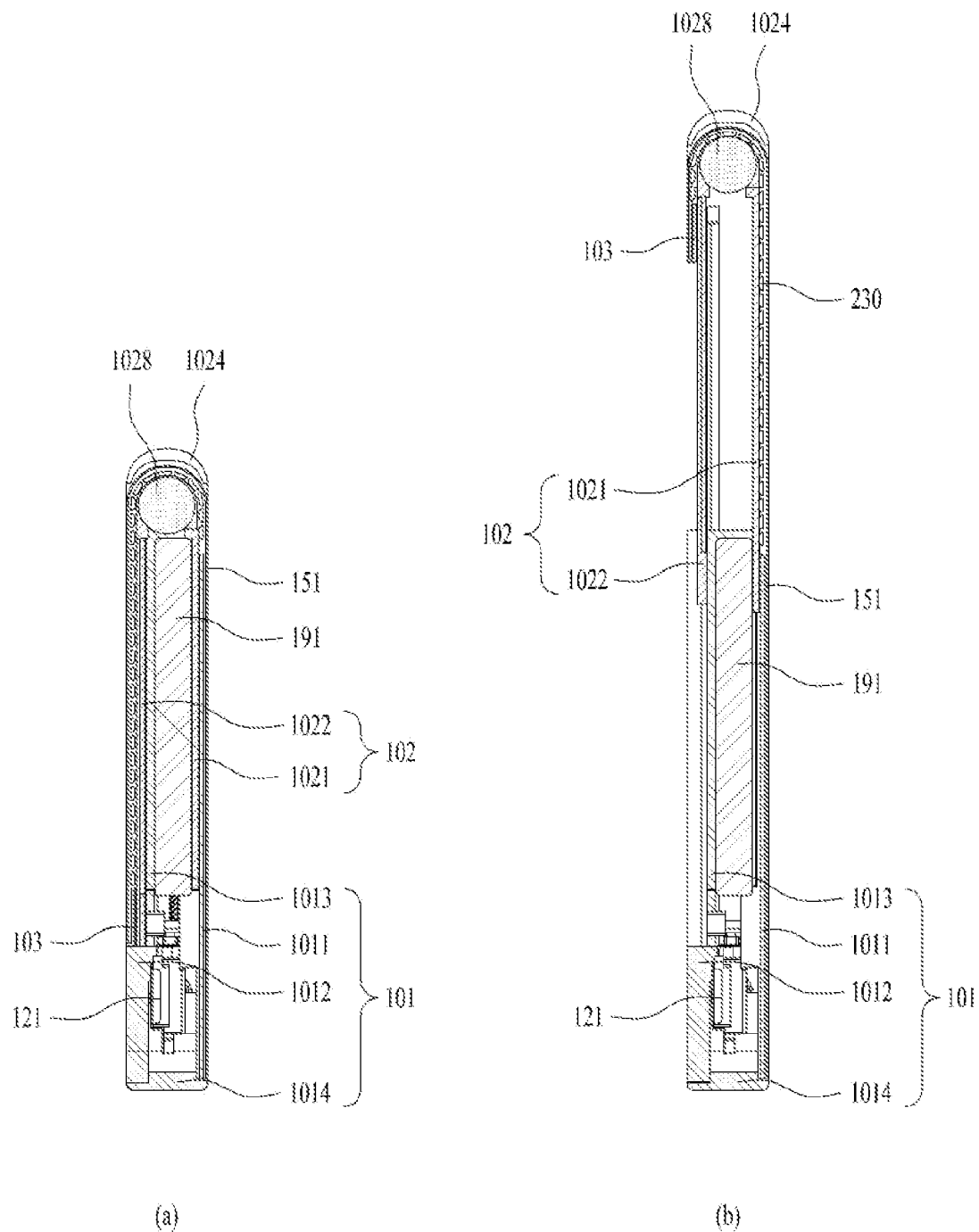
FIG. 5 shows cross-sectional views respectively taken along a line A-A and a line B-B of FIG. 3.

FIG. 2 is an exploded perspective view illustrating a mobile terminal according to the present disclosure. FIG. 3 is a perspective view illustrating first and second states of a mobile terminal viewed in one lateral side. FIG. 4 is a rear view illustrating first and second states of a mobile terminal. FIG. 5 is a sectional view illustrating first and second states of a mobile terminal, obtained along the cutting lines A-A and B-B of FIG. 2, respectively. In the above drawings, FIG. 3(a), FIG. 4(a) and FIG. 5(a) illustrate a first state of a mobile terminal and FIG. 3(b), FIG. 4(b) and FIG. 5(b) illustrates a second state of the mobile terminal.

As illustrated in the drawings, a mobile terminal 100 of a first state is contracted (or retracted) and has a size smaller than that of the mobile terminal 100 of a second state. Moreover, a size of a display 151 located on a front surface of the mobile terminal 100 becomes smaller than that in a second state. On the other hand, the mobile terminal 100 of the first state is extended in a first direction D1 so as to switch to the second state. In the second state, a size of the mobile terminal 100 and a size of the display 151 located on the front surface become greater than those of the first state. In the following description, a direction in which the mobile terminal 100 and the display 151 thereof are extended (or enlarged) is referred to as a first direction D1, a direction in which the mobile terminal 100 and the display 151 thereof are contracted (or retracted) or reduced is referred to as a second direction D2, and a direction vertical to the first and second directions D1 and D2 is referred to as a third direction.

The mobile terminal 100 of the present disclosure may switch from the first state in which the display 151 is located on the front surface like a bar-type mobile terminal like FIG. 3(a) to the second state by extending the screen like FIG. 3(b). In the second state, a size of the display 151 located on the front surface is enlarged and a size of the display 151 located on a rear surface is reduced like FIG. 4(b). Namely, the display 151 used to be located on the rear surface of the mobile terminal 100 in the first state is moved to the front surface of the mobile terminal 100 in the second state.

Thus, in order for a position of the display to be variable, the display may employ a flexible display unit 151. A flexible display means a display that is light-weighted, easily-unbreakable and heavy-duty display fabricated on a thin and flexible substrate capable of curving, bending, folding, twisting and rolling-up like a paper by maintaining the properties of the existing flat panel display.

Moreover, an electronic paper employs a display technology provided with the features of the normal ink and may differ from the existing flat panel display in using reflective light. The electronic paper may change information by electrophoresis using twist balls or capsules.

In a state that the flexible display unit 151 is not deformed (e.g., a state having an infinite curvature radius: hereinafter a basic state), a display region of the flexible display unit 151 becomes a plane. In a state deformed from the basic state by an external force (e.g., a state having a finite curvature radius: hereinafter a deformed state), the display region may become a curved surface. As illustrated in the drawing, information displayed in the deformed state may become visual information outputted to the curved surface. Such visual information is implemented in a manner that light emittance of subpixels deployed in a matrix form is controlled independently. The subpixel means a minimum unit for implementing a single color.

The flexible display unit 151 may lie not in a flat state but in a curved state (e.g., a top-bottom or right-left curved state) from the basic state. In this case, if an external force is applied to the flexible display unit 151, the flexible display unit 151 may be deformed into a flat state (or a less-curved state) or a more-curved state.

Meanwhile, the flexible display unit 151 may implement a flexible touchscreen by being combined with a touch sensor. If a touch is applied to the flexible touchscreen, the controller 180 (see FIG. 1) may perform a control in response to such a touch input. The flexible touchscreen may be configured to sense a touch input in the deformed state as well as in the basic state.

The touch sensor senses a touch (or a touch input) applied to the touchscreen using at least one of various touch types such as a resistance layer type, an electrostatic capacitance type, an infrared type, an ultrasonic type, etc.

For example, a touch sensor may be configured to convert a pressure applied to a specific portion of a touchscreen or a variation of electrostatic capacitance generated from the specific portion into an electric input signal. A touch sensor may be configured to detect a position or size of the touch sensor touched by a touch target applying a touch to a touchscreen, a pressure of the touch, an electrostatic capacitance of the touch, etc.

Meanwhile, a deformation sensing means for sensing deformation of the flexible display unit 151 may be provided to the mobile terminal 100. Such a deformation sensing means may be included in the sensing unit 140 (see FIG. 1).

The deformation sensing means is provided to the flexible display unit 151 or the case (or housing) (i.e., first to third frame 101 to 103 described later), thereby sensing information related to deformation of the flexible display unit 151. Here, the information related to the deformation includes a deformed direction of the flexible display unit 151, a deformed extent, a deformed position, a deformed time, a restored acceleration of the deformed flexible display unit 151, etc., and may further various kinds of information sensible as the flexible display unit 151 is curved.

Based on the information related to the deformation of the flexible display unit 151 and sensed by the deformation sensing means, the controller 180 may change information displayed on the flexible display unit 151 or generate a control signal for controlling a function of the mobile terminal 100.

The size changes of the display unit 151 on the front and rear surfaces of the mobile terminal according to the state switching (first or second state) of the flexible display unit 151, i.e., the size change of the mobile terminal 100 may be performed manually by a force applied by a user, which is non-limited by the manual way. For example, when the mobile terminal 100 or the flexible display unit 151 is in the first state, it may be deformed into the second state by a command of a user or application without an external force applied by the user. Thus, in order for the flexible display unit 151 to be automatically deformed without such an external force, the mobile terminal 100 may include a driving unit 200 described later.

The flexible display unit 151 of the present disclosure is rolled round a predetermined one of both side parts of the mobile terminal 100, thereby being folded at 180°. Hence, one portion of the display unit 151 is disposed on the front surface of the mobile terminal 100 with reference to such a side part, while the rest is disposed on the rear surface of the mobile terminal 100. Some portion of the display unit 151 located on the front surface of the mobile terminal 100 may be fixed to the front surface not to move, while the rest of the display unit 151 located on the rear surface of the mobile terminal 100 may be provided to be movable on the rear surface.

The display unit 151 may be rolled or unrolled round the side part, whereby a size of the region disposed on the front surface of the mobile terminal 100 may be adjusted by moving a part of the display unit 151 disposed on the rear surface of the mobile terminal 100. Since a size of the flexible display unit 151 is determined and the flexible display unit 151 includes a single continuous body, if a size of the flexible display unit 151 located on the front surface of the mobile terminal 100 is increased, a size of the flexible display unit 151 located on the rear surface of the mobile terminal 100 is decreased. The above-configured display unit 151 may be rolled within the second frame 102 relatively movable to the first frame 101, which will be described later, and more specifically, around a predetermined side part of the second frame 102, and withdrawn (or pulled out) from or inserted (or pushed) into the second frame 102 by being rolled around the second frame 102 along a moving direction of the second frame 102 to adjust the size of the display unit 151 on the front surface of the mobile terminal 100. Such an operation will be described in detail together with other related components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

With reference to FIGS. 2 to 5, a detailed configuration of the mobile terminal 100 of the present disclosure will be described in detail below. A following description will be achieved basically with reference to FIG. 2 illustrating an overall configuration. FIGS. 3 to 5 are referred to explain detailed features of corresponding components in the first and second states of the mobile terminal 100.

The mobile terminal 100 of the present disclosure includes a main frame in which components are mounted, and the main frame of the present disclosure may vary in size in the first direction as shown in FIG. 2. One or more frames move relative to each other, and sizes thereof may vary in the first direction. Electronic components are mounted in the main frame, and the flexible display unit 151 is located out of the main frame.

Since the mobile terminal 100 of the present disclosure includes the flexible display unit, the flexible display unit 151 may be combined in a form surrounding a front face and a rear face of the main frame. The main frame may include first to third frames 101 to 103. The main frame may include the first frame 101, the second frame 102 moving in the first direction with respect to the first frame 101, and the third frame 103 moving in the first direction with respect to the second frame 102. The first frame 101 and the second frame 102 include front portions, a rear portions, and side portions, respectively, and are coupled to each other. Thus, the mobile terminal 100 may have a hexahedral outer shape by such coupled first and second frames 101 and 102. In consideration of a illustrated configuration of the first to third frames 101 to 103, movements of the second and third frames 102 and 103 may be a slide movement.

First of all, the first frame 101 corresponds to a main body of the mobile terminal 100 and may form a space inside to receive various parts therein. And, the first frame 101 may receive the second frame 102, which is movably coupled to the first frame 101, within such a space. Particularly, as illustrated in FIG. 2 and FIG. 5, the first frame 101 may include a first front part 1011 disposed on the front surface of the mobile terminal 100 and first and second rear parts 1011 and 1012 disposed on the rear surface of the mobile terminal 100.

Each of the first front part 1011, the first rear part 1012 and the second rear part 1013 may include an approximately flat plate-type member. The first rear part 1012 and the second rear part 1013 may include separate members coupled together or a single member illustrated in the drawing. In order to form a predetermined space, the first font part 1011 and the first/second rear part 1012/1013 may be spaced apart from each other in a predetermined gap and connected to each other by a lateral part 1014. As parts of the mobile terminal 100, the controller 180 and the power supply unit 190 may be received in the space within the first frame 101. For example, the controller 180 may include a circuit board including a processor and electronic circuit for controlling operations of the mobile terminal 100 and the power supply unit 190 may include a battery and related parts. Moreover, the second frame 102 and the driving unit 200 described alter may be received in the first frame 101 as well.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. When the flexible display unit 151 may be damaged when being bent. Thus, the flexible display unit 151 may be formed to be bent with a predetermined curvature.

The display unit 151 may be divided into a fixed portion and a variable portion. The fixed portion means a portion fixed to the frame. Because of being fixed to the frame, the fixed portion maintains a constant shape without changing a bending degree. On the other hand, the variable portion means a portion in which a bending angle or a position of the bent portion changes. The variable portion in which the position or bending angle of the bent portion changes requires a structure for supporting a rear face of the variable portion in response to the change.

A first region of the display unit 151 may be coupled to the first front portion 1011 corresponding to the front face of the mobile terminal 100.

On the other hand, as well illustrated in FIG. 4, for the installation of various physical input units 120 and sensor units 140 for manipulations of the mobile terminal 100, the display unit 151 may be disposed on the second rear part 1013 only. Since the first rear part 1012 is always exposed externally, the input unit 120 such as various buttons, switches, the camera 121 and a flash and the sensor unit 140 such as the proximity sensor 141 may be disposed on the first rear part 1012. A typical bar-type terminal includes a display unit provided to a front surface of the terminal only. Hence, a camera is disposed on a rear surface of the terminal in order to capture an image by viewing a thing located at the opposite side of a user through a display unit. In order for the user to capture himself by viewing himself through the display unit, an additional camera needs to be provided to the front surface of the terminal.

Yet, according to the mobile terminal 100 of the present disclosure, the display unit 151 is located on both of the front and rear surfaces thereof. Therefore, when a user takes a selfie, the display unit located on the same side of the camera 121, i.e., a portion of the display unit 151 located on the rear surface of the mobile terminal 100 in the drawing may be used. When a thing at the opposite side of the user is captured, the display unit located on the opposite side of the camera 121, i.e., a portion of the display unit 151 on the front surface of the mobile terminal 100 in the drawing may be used. For that reason, the mobile terminal 100 may capture a thing located at the opposite side of a user or a selfie using the single camera 121. The camera may include a plurality of cameras of different view angles such as a wide angle, a super wide angle, a telescope, etc. A proximity sensor, an audio output module and the like may be located on the first rear part 1012 as well as the camera, and an antenna 116 may be installed thereon.

The lateral part 1014 may be elongated along edges of the first front part 1011 and the first/second rear part 1012/1013 to enclose a circumference of the first frame 101 and form an exterior of the mobile terminal 100. Yet, as mentioned above, since the second frame 102 is received in the first frame 101 and movably coupled thereto, a portion of the first frame 101 needs to be open to allow the relative movement of the second frame 102 to the first frame 101. As well illustrated in FIG. 2, for example, since the second frame 102 is movably coupled to one of both side parts of the first frame 101, the lateral part 1014 is not formed at such a side part, thereby opening it. Hence, the first frame 101 may include a first side part 101a substantially closed and a second side part 101b disposed to oppose the first side part 101a so as to be open. Since the lateral part 1014 is exposed from the mobile terminal 100, the interface unit 160 for connecting to a power port or an earphone jack or the user input unit 120 such as a volume button and the like may be disposed thereon. In case of containing metal substance, the lateral part 1014 may play a role as an antenna.

The second rear portion 1013 of the first frame 101 may be covered by the display unit, but may be disposed on the front face of the display unit using a transparent material.

Referring to FIG. 2, the second frame 102 may include a second front part 1021 disposed on the front surface of the mobile terminal 100 and a third rear part 1022 disposed on the rear surface of the mobile terminal 100. Like the first front part 1011, the first rear part 1012 and the second rear part 1013 of the first frame 101, each of the second front part 1021 and the third rear part 1022 may be formed of an approximately flat plate-type member. Moreover, the second frame 102 may receive various parts therein and should not interfere with the parts received in the first frame 101 while moving. Hence, the second front part 1021 and the third rear part 1022 may be coupled together in a manner of being spaced apart from each other and have a shape not interfering with the parts within the first frame 101.

Moreover, the display unit 151 may be folded at 180° while being rolled up within the second frame 102 so as to be disposed on both of the front and rear surfaces of the mobile terminal 100. For such arrangement of the display 151, the second frame 102 may include a roller 1028 rotatably disposed therein. The roller 1028 may be disposed at a random position within the second frame 102. Yet, the display 151 should be spread flat on the front and rear surfaces of the mobile terminal 100 to provide a user with a screen of a good quality. For such a spread, an appropriate tension should be provided to the display 151. In order to provide the proper tension, the roller 1028 may be disposed at a first directional end of the second frame 102. The roller 1028 may extend in the third direction, and may be rotatably coupled to the second frame 102.

The display unit 151 may be rolled around the roller 1028 by being gradually curved with a predetermined curvature. Moreover, the roller 1028 may be installed to freely rotate on the second frame 102 by contacting with an inner surface of the display unit 151. Therefore, the roller 1028 is substantially capable of moving the display unit 151 in a direction vertical to a lateral direction, i.e., a length direction of the mobile terminal 100. As described later, when the second frame 102 is slid, the display unit 151 is moved by the tension applied by the second frame 102 to the front or rear surface of the mobile terminal 100 relatively to the second frame 102 in a different direction (i.e., the first direction D1 or the second direction D2). In doing so, such a movement may be guided by the roller 1028 that is rotating.

In addition, the roller 1028 is disposed on a first side portion 102a of the second frame 102, and the first side portion 102a actually corresponds to an outermost side portion of the mobile terminal 100. When the first side portion 102a of the second frame 102 is exposed, the display unit 151 rolled on the roller 1028 may be damaged. Accordingly, the second frame 102 may include a side frame 1024 disposed on the first side portion 102a.

The side frame 1024 extends in the longitudinal direction of the second frame 102 to cover the first side portion 102a, thereby protecting the roller 1028 and the display unit 151 rolled thereon. That is, the side frame 1024 covers the side face of the display unit 151, and the side face thereof is located in the third region. The first to third regions are at specified positions on the flexible display unit and do not change in size or position, but the sizes of the front face and the rear face, and the position of the side face are determined based on the state of the main frame.

The first region and the second region correspond to the fixed portion described above, and the third region corresponds to the variable portion described above.

The third region may vary in position depending on the state of the mobile terminal. Because the side face is rolled by the roller, the side face is bent with the predetermined curvature, and an inner face of the side frame may include a curved face corresponding to the curvature of the side face.

Because of the side frame 1024, the second frame 102 may have the substantially closed first side portion 102a, and the side frame 1024 may substantially form the outer shape of the mobile terminal 100 together with the side face 1014 of the first frame 101. In addition, the second frame 102 may include a second side portion 102b that is disposed opposite the first side portion 102a to minimize interference with the components within the first frame 101 during the movement, and is opened.

Such a second frame 102 is movably coupled to the first frame 101, and thus may slide in the predetermined first or second direction D1 or D2 relative to the first frame 101. More specifically, the second frame 102 may be movably coupled to the first frame 101 through the side portion of the first frame 101, more precisely, through the opened second side portion 101b, as shown. More specifically, the second side portion 102b of the second frame is disposed relatively adjacent to the first side portion 101a of the first frame 101 which is closed. Accordingly, the first side portion 102a of the second frame may be disposed to be opposite to the first side portion 101a. Accordingly, the second side portion 102b is inserted into the first frame 101 through the side portion of the first frame, that is, the second side portion 101b thereof. The first side portion 102a is not inserted into the first frame 101 but is always located outside the first frame 101, thereby forming the outer shape of the mobile terminal 100 as described above. However, when necessary, such first side portion 102b of the second frame 102 may also be inserted into the first frame 101.

Because of such positional relationship, the second frame 102 may extend from or contract to the first frame 101 in a direction perpendicular to the longitudinal direction of the mobile terminal 100 or the first frame 101. That is, the first and second directions D1 and D2 may basically be directions perpendicular to the longitudinal direction of the mobile terminal 100 or the first frame 101. Further, the first and second directions D1 and D2 may also be described as the lateral direction or the horizontal direction of the mobile terminal 100 or the first frame 101. In addition, during the movement in the first direction D1, the second frame 102 extends from the first frame 101. Accordingly, the first direction D1 may be a direction in which the second frame 102 moves away from the first frame 101, that is, moves outwardly of the mobile terminal 100 or the first frame 101. On the other hand, during the movement in the second direction D2, the second frame 102 contracts to the first frame 101. Thus, the second direction D2 is a direction opposite to the first direction D1, so that the second direction D2 may be a direction in which the second frame 102 moves to become closer to the first frame 101, that is, moves inwardly of the mobile terminal 100 or the first frame 101. When being moved in the first direction D1, such second frame 102 extends and applies a force to the portion of the display unit 151 disposed on the rear face of the mobile terminal 100, so that the portion of the display unit 151 may be disposed on the front face of the mobile terminal 100, and a region for such additional arrangement may be defined. Thus, the second frame 102 may convert the mobile terminal 100 into the second state with the display unit 151 with the relatively extended front face by moving in the first direction D1. On the other hand, when being moved in the second direction D2, the second frame 102 contracts into an original state thereof, and applies a force to the portion of the display unit 151 disposed on the front face of the mobile terminal 100 to return to the rear face of the mobile terminal 100 again. Thus, the second frame 102 may convert the mobile terminal 100 into the first state with the display unit 151 with the relatively contracted front face by moving in the second direction D2. Accordingly, the second frame 102 selectively exposes the display unit 151 to the front face of the mobile terminal 100 depending on the moving direction (i.e., the first or second direction D1 and D2). Accordingly, the mobile terminal 100 may be converted into the first or second state defined above.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above.

Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, as shown in FIG. 5. That is, a front face of the second front portion 1021 may face the rear face of the first front portion 1011. In addition, the rear face of the first front portion 1011 may be in contact with the front face of the second front portion 1021 to stably support the movement of the second frame 102.

The third rear portion 1022 of the second frame 102 may be disposed below the second rear portion 1013 of the first frame 101. That is, the front face of the third rear portion 1022 may face the rear face of the second rear portion 1013. In addition, the rear face of the second rear portion 1013 may be in contact with the front face of the third rear portion 1022 to stably support the movement of the second frame 102. Because of such arrangement, the third rear portion 1022 may be exposed to the outside of the first frame, more precisely, of the second rear portion 1013, and may be coupled to the display unit 151.

Alternatively, when the second rear portion 1013 is made of a transparent material, the second rear portion 1013 may form an outer shape of the rear face of the mobile terminal. The second rear portion 1013 may be positioned rearward of the third rear portion 1022 of the second frame, and the flexible display unit may be disposed between the second rear portion 1013 and the third rear portion 1022 in the first state.

When the second rear portion 1013 is made of a material such as a transparent glass to form the outer shape of the rear face of the mobile terminal, the first rear portion 1012 may be implemented using the same member as the second rear portion 1013. That is, the camera 121, the flash or the sensing unit 140, and the like may be arranged by partially coating the plate-shaped member of the transparent glass material to not allow the internal components to be visible and by not coating only a required portion.

In addition, the second frame 102 may expand and contract the size of the mobile terminal 100 itself, particularly the front face of the mobile terminal 100 by the expansion and the contraction in the first and second directions D1 and D2. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is expanded or contracted. For this reason, the display unit 151 may be movably coupled to the second frame 102. More specifically, the display unit 151 may include a first side edge (or side end) 151d disposed on the front face of the mobile terminal 100 and a second side edge 151e opposite to the first side edge 151d and disposed on the rear face of the mobile terminal 100. The first side edge 151 may be disposed on the front face of the first frame 101, that is, the front face of the first front portion 1011 thereof, and may be disposed adjacent to the side portion of the mobile terminal 100, that is, the first side portion 101a of the first frame. On the other hand, since the second side edge 151e is adjacent to the rear face of the mobile terminal 100 and the third rear portion 1022 of the second frame 102, the second side edge 151e may is be coupled the third rear portion 1022 of the second frame 102 to be movable in the first and second directions D1 and D2. In addition, since the display unit 151 is not structurally strong, a third frame 103 may be coupled to the second side edge 151e. The third frame 103 may be formed of a plate-shaped member extending in the longitudinal direction of the mobile terminal 100. Accordingly, the third frame 103 may be coupled to the second frame, that is, the third rear portion 1022 thereof to be movable in the first and second directions D1 and D2 instead of the second side edge 151e. In addition, the second frame 102 may include a slot 1025 extending in the lateral direction of the mobile terminal 100 or the second frame 102, that is, the direction perpendicular to the longitudinal direction thereof. Further, the third frame 103 may be stably moved while being guided by the slot 1025. The third frame 103 may include, for example, a projection inserted into the slot 1025 for the movement along the slot 1025.

Referring to FIGS. 3 to 5, in connection with such configuration of the first to third frames 101, 102, and 103, the display unit 151 may include a first region 1511 extending from one side thereof, that is, the first side edge 151d toward the second side edge 151e by a predetermined length, and a second region 1512 disposed opposite the first region 1511, and extending from the second side edge 151e toward the first side edge 151d by a predetermined length. In addition, the display unit 151 may include a third region 1513 disposed between the first and second regions 1511 and 1512. Such first to third regions 1511, 1512, and 1513 may be connected to each other, and may form a continuous body of the display unit 151. In addition, as described above, for the movement of the third region 1513 toward the front face or the rear face of the mobile terminal 100 depending on the moving direction of the second frame 102, the first region 1511 may be fixed so as not to move to the front face of the mobile terminal 100, and the second region 1512 may be provided to be movable on the rear face of the mobile terminal. Such configuration of the display unit 151 will be described in more detail below.

The first region 1511 may be disposed on the front face of the mobile terminal 100, more specifically, the first frame 101, that is, on the front face of the first front portion 1011. The first region 1511 is fixed to the first frame 101, that is, the front face of the first front portion 1011 so as not to be moved during the movement of the second frame 102, and thus, the first region 1511 may always be exposed to the front face of the mobile terminal 100. The third region 1513 may be adjacent to the first region 1511, and may extend into the second frame 102 and rolled on the roller 1028. The third region 1513 may consecutively extend out of the second frame 102 again and partially cover the second frame 102, that is, the rear face of the third rear portion 1022. Further, the second frame 102, that is, the third rear portion 1022, is adjacent to the first frame 101, that is, the second rear portion 1013 and together forms the rear case of the mobile terminal 100, so that it may be described that the third region 1513 is also disposed on the rear face of the first frame 101.

The second region 1512 may be adjacent to the third region 1513 and may be disposed on the rear face of the mobile terminal 100, more specifically, on the second frame, that is, the rear face of the third rear portion 1022 thereof. The second region 1512 may be coupled to the third frame 103 without being directly coupled to the second frame 102. As shown in FIG. 4(b), the slot 1025 extending in the lateral direction (i.e., the direction perpendicular to the longitudinal direction of the mobile terminal 100) to the second frame 102, that is, to the third rear portion 1022 is defined. Further, the third frame 103 may move along the slot 1025. In FIG. 4(b), it is shown that the slot 1025 is defined in the rear face of the second frame 102, but may be defined in the side face of the second frame 102. Although the second region 1512 may move in the first or second direction D1 or D2 with respect to the second frame 102 together with the third frame 103, the movement of the second region 1512 may be restricted within the rear face of the mobile terminal 100 by the slot 1025. That is, the second region 1512 does not move out of the second frame 102 even when the second frame 102 is extended or contracted, and may move along the slot 1025 within the second frame 102 by the extended or contracted distance of the second frame 102. Accordingly, the second region 1512 may always be exposed to the rear face of the mobile terminal 100.

As a result, the first region 1511 may be disposed on the front face of the mobile terminal 100 and may be always exposed to the front face regardless of the movement of the second frame 102, and the second region 1512 may be disposed on the rear face of the mobile terminal 100 and may be always exposed to the rear face regardless of the movement of the second frame 102. In addition, the third region 1513 may be disposed between the first and second regions 1511 and 1512, and may be selectively placed on the front face or the rear face of the mobile terminal 100 depending on the moving directions D1 and D2 of the second frame 102.

Because of such selective placement of the third region 1513, as shown in FIG. 4(b), the second rear portion 1013 of the first frame 101 is covered by the second and third regions 1512 and 1513 and the third rear portion 1022 of the display unit 151 in the first state, but the third region 1513 moves to the front face of the mobile terminal 100 in the second state, and the third rear portion 1022 also moves in the first direction D1, so that the mobile terminal 100 may be exposed to the outside. In addition, the second front portion 1021 of the second frame 102 is disposed below the first front portion 1011 of the first frame 101 in the first state, but is moved out of the first frame 101 and supports the third region 1513 of the display unit 151 disposed on the front face of the mobile terminal 100 in the second state.

Since the first and second regions 1511 and 1512 are always respectively arranged on the front face and the rear face of the mobile terminal 100, curvatures of the first region 1511 and the second region 1512 do not change, and the first region 1511 and the second region 1512 may be maintained in a flat basic state. However, the third region 1513 may be rolled on the roller 1028 and bent in the second frame 102. When converting from the first state to the second state, the third region 1513 may extend from the second frame 102 to the front face of the mobile terminal 100 while being rolled on the roller 1028 in one direction. On the other hand, when converting from the second state to the first state, the third region 1513 may be retracted from the front face of the mobile terminal 100 to the second frame 102 while being rolled on the roller 1028 in the opposite direction, and at the same time, may return to the rear face of the mobile terminal 100 from the second frame 102. A specific location of the foldable mobile terminal in a form of being spread like a book is easily damaged because only the specific location is folded repeatedly. On the other hand, the deformed portion of the flexible display unit 151, that is, a portion rolled on the roller 1028, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

As shown in FIGS. 3A, 4A, and 5A, the second frame 102 is fully retracted into the first frame 102 in the first state. Therefore, only the first region 1511 of the display unit 151 fixed to the front face of the first frame 101 may be exposed to the front face of the mobile terminal 100. Such first region 1511 may be fixed and supported to the first frame 101, that is, the first front portion 1011 thereof. In addition, a major portion of the third region 1513 may be disposed on the rear face of the mobile terminal 100 together with the second region 1512, and the third region 1513 may be disposed in the second frame 102 while being partially rolled on the roller 1028. The third region 1513 of the rear face of the mobile terminal 100 may be supported by the second frame, that is, the third rear portion 1022 thereof. The second region 1512 may be fixed by the third frame 103 disposed on the second frame (i.e., the third rear portion 1022) and may be movably coupled to the second frame 1012.

In such first state, when the second frame 102 moves in the first direction D1, the mobile terminal 100 may be converted into the second state. As shown in FIGS. 3B, 4B, and 5B, the second frame 102 may extend from the first frame 101 by the movement in the first direction D1, and may increase the overall size of the mobile terminal 100, in particular, the front face thereof. During the movement in the first direction D1, the second frame 102 may apply a force, that is, a tension, to the display unit 151 in the first direction D1. The display unit 151 is fixed to the first frame 101 but is coupled to the second frame 102 so as to be movable using the third frame 103, so that the force applied by the second frame 102 allows the third region 1513 to be rolled out from the roller 1028 of the second frame 102 to the front face of the mobile terminal 100. That is, the third region 1513 may be withdrawn (or pulled out) from the second frame 102 or extend to (or move out of) the second frame 102. At the same time, the third region 1513, particularly, the portion located on the rear face of the third region 1513 may be rolled into the roller 1028 of the second frame 102 from the rear face, or may be inserted (or pushed in), retracted, or moved into the second frame 102. Not an entirety of the third region 1513 is withdrawn from the second frame 102 to the front face of the mobile terminal 100, and a portion of the third region 1513 may be disposed in the second frame 102 while still being rolled on the roller 1028. In addition, for the smooth movement of the third region 1513, the second region 1512 may also move in the first direction D1 with respect to the second frame 102 together with the third frame 103. In addition, as described above, the second region 1512 and the third frame 103 may be constrained to the second frame 102 and move in the first direction D1 with respect to the first frame 101 together with the second frame 102. Accordingly, the second region 1512 and the third frame 103 may move in the first direction D1 relative to the first frame 101 as well as the second frame 102, and accordingly, move a distance longer than the moved distance of the second frame 102. Thus, because of such long distance movement in the first direction D1 of the second region 1512, the third region 1513 may be smoothly extended to the front face of the mobile terminal 100. Further, for the movement of the third region 1513, which is proportional to the expansion of the second frame 102, the movement of the second region 1512 and the third frame 103 in the first direction D1 may be performed simultaneously with the movement of such third region 1512 and second frame 102 in the first direction D1 so as to be proportional to the movement of third region 1513 and second frame 102.

When the second frame 102 is fully extended in the first direction D1, the first and third regions 1511 and 1513 may be arranged on the front face of the mobile terminal 100, and only the second region 1512 may be disposed on the rear face of the mobile terminal 100. Such first and third regions 1511 and 1513 may be supported by the first frame (i.e., the first front portion 1011 thereof) and the second frame (i.e., the second front portion 1021 thereof). In addition, the second frame 102, i.e., the third rear portion 1022 thereof exposes the second rear portion 1013 of the first frame while extending in the first direction D1, and supports the moving third region 1513. Therefore, in the second state, the mobile terminal 100 may have the extended front face display unit 151.

On the other hand, when the second frame 102 moves in the second direction D2 in the second state, the mobile terminal 100 may again return into the first state as shown in FIGS. 3A, 4A, and 5A. The second frame 102 may be contracted to the first frame 101 by the movement in the second direction D2, and may reduce the overall size of the mobile terminal 100, particularly the front face thereof. The movement of the display unit 151 during such movement of the second frame 102 may be performed in a reverse order of the movement in the first direction D1 described above. In brief, the third region 1513 may be rolled from the front face of the mobile terminal 100 into the roller 1028 of the second frame 102, or may be inserted, retracted, or moved into the second frame 102. At the same time, the third region 1513 may be rolled, withdrawn, extended, or moved out of the roller 1028 of the second frame 102 to the rear face of the mobile terminal 100. Not the entirety of the third region 1513 may be withdrawn from the second frame 102 to the rear face of the mobile terminal 100, and the portion of the third region 1513 may still be placed in the second frame 102 while still being rolled on the roller 1028. In addition, for such smooth movement of the third region 1513, the second region 1512 may also move in the second direction D2 with respect to the second frame 102 together with the third frame 103. The second region 1512 and the third frame 103 may be constrained to the second frame 102 to move in the second direction D2 with respect to the first frame 101 together with the second frame 102. Accordingly, the second region 1512 and the third frame 103 may move relatively in the second direction D2 with respect to not only the second frame 102 but also the first frame 101. As a result, the second region 1512 and the third frame 103 may move in the second direction D2 a distance larger than the moved distance of the second frame 102. Thus, because of such long distance movement of the second region 1512, the third region 1513 may be smoothly returned to the rear face of the mobile terminal 100. Further, for the movement of the third region 1513 proportional to the contraction of the second frame 102, the movements of the second region 1512 and the third frame 103 in the second direction D2 may be performed simultaneously with the movements of the third region 1512 and the second frame 102 in the second direction D2 to be proportional to the movements of the third region 1513 and the second frame 102. When the second frame 102 is completely contracted in the second direction D2, the mobile terminal 100 may be converted into the first state as described above, and may have the display unit 151 with the front face that is relatively reduced in comparison with the second state in the first state.

Figure 6:
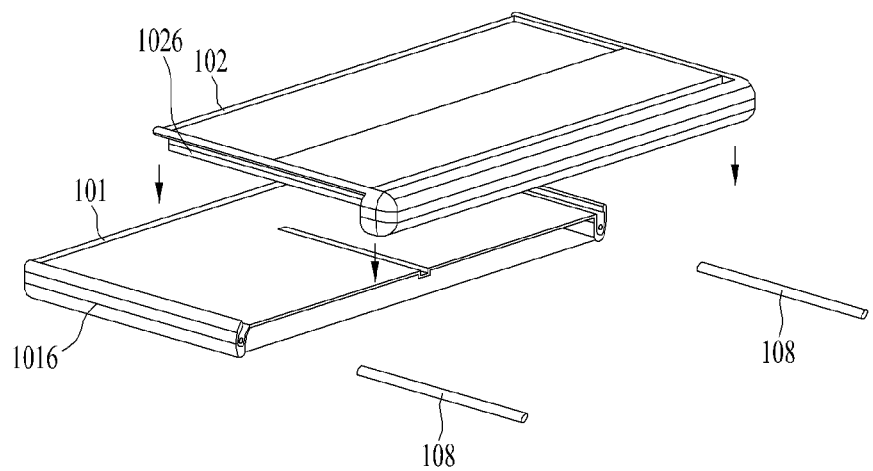
FIG. 6 is a perspective view illustrating a first frame, a second frame, and a slide bar of the mobile terminal according to the present disclosure.
Figure 6:
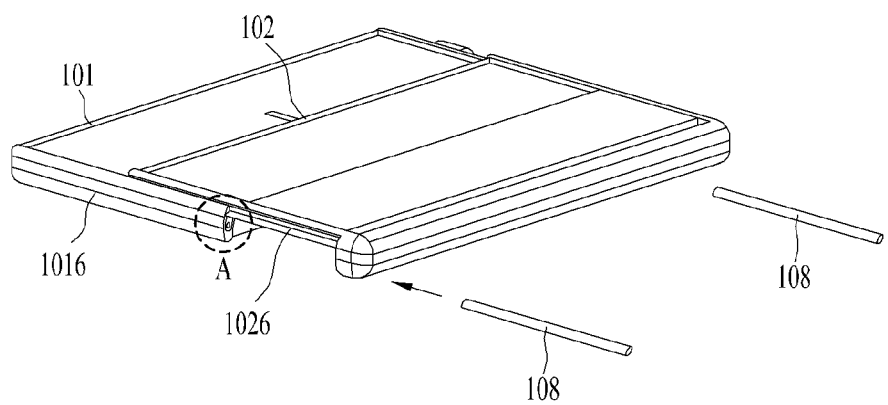

FIG. 6 is a perspective view illustrating a first frame 101, a second frame 102, and a slide bar 108 of the mobile terminal 100. A slide structure is required to minimize frictional force during slide movement between the first frame 101 and the second frame 102. Accordingly, the present disclosure provides a slide structure that moves in response to slide movement of the second frame 102 while minimizing the size of a contact area between the first frame 101 and the second frame 102, resulting in reduction in frictional force.

In general, a plurality of balls may be disposed between two members (i.e., the first frame 101 and the second frame 102) in order to reduce frictional force between the two members. The plurality of balls may move while rotating in response to slide movement, resulting in reduction in frictional force between the first frame 101 and the second frame 102. However, it is difficult for the plurality of balls to be inserted between the first frame 101 and the second frame 102 during a fabrication process, resulting in an increase in production costs. In addition, it is also difficult for the plurality of balls to be designed with a uniform diameter. The mobile terminal according to the present disclosure can use the rail 107 and the slide bar 108 in a manner that a fabrication process can be simplified and a volume occupied by the slide structure can be minimized.

Referring to FIG. 6, the first frame 101 and the second frame may include a first front portion 1011, a second front portion 1021, a first rear portion 1012, and a second rear portion 1013 that are arranged to overlap each other in a thickness direction. If the side structure is added due to a small thickness of the structure overlapping in the thickness direction, the mobile terminal 100 becomes larger in thickness.

Therefore, the slide structure may be located on a side surface of each of the first frame 101 and the second frame 102. The first surface 1016 of the first frame 101 and the second surface 1026 of the second frame may be arranged to face each other. The first surface 1016 and the second surface 1026 may be disposed at the end portion of a third direction perpendicular to the direction of slide movement, and may be symmetrically disposed at both sides of the third direction as shown in the attached drawings.

Although the first side surface 1016 is located outside the second side surface 1026 as shown in the drawings, the scope or spirit of the present disclosure is not limited thereto, and it should be noted that the first side surface 1016 may also be disposed outside the second side surface 1026 of the second frame 102 as needed. The rail 107 and the slide bar 108 may be implemented between the overlap structures of the first frame 101 and the second frame 102.

Figure 7:
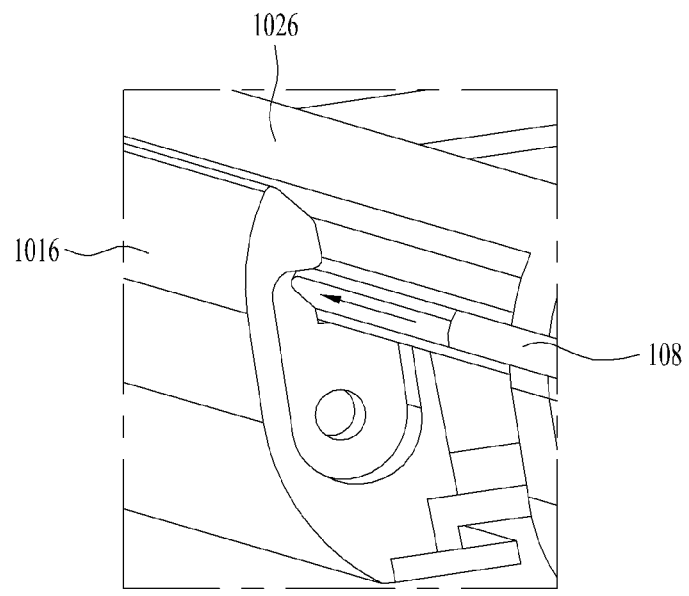
FIG. 7 is a diagram illustrating a slide bar and a rail cap of the mobile terminal according to the present disclosure.
Figure 7:
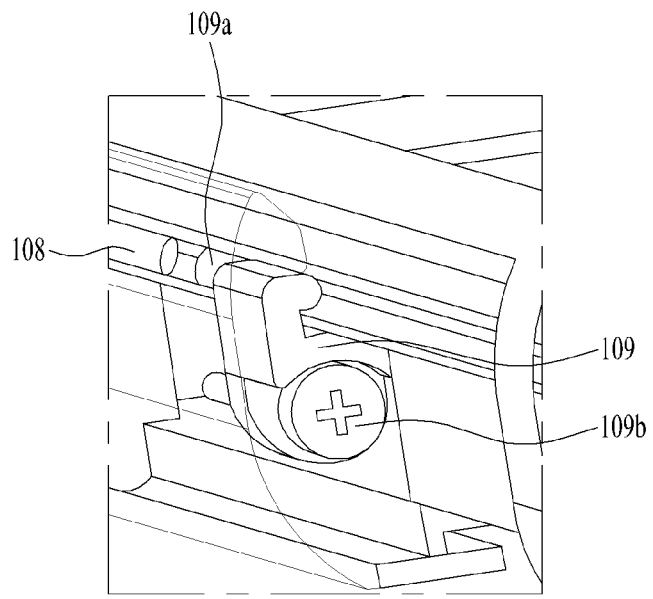

FIG. 7 is a diagram illustrating a slide bar 108 and a rail cap 109 of the mobile terminal 100 according to the present disclosure. FIG. 7(*a*) is an enlarged view of the portion (A) shown in FIG. 6. The structure of FIG. 7(*a*) includes a first groove 1071 and a second groove 1072 formed to face each other on the first side surface 1016 and the second side surface 1026. The first groove 1071 and the second groove 1072 may be concavely formed in the first side surface 1016 and the second side surface 1026, and may extend in the first direction. A spacing between the first groove 1071 and the second groove 1072 may serve as the rail 107. The slide bar 108 may be inserted into the rail 107, and the slide bar 108 may restrict movement either in a thickness direction or in the third direction of the first frame 101 and the second frame 102, and may allow only slide movement in the first direction or the second direction opposite to the first direction.

Figure 8:
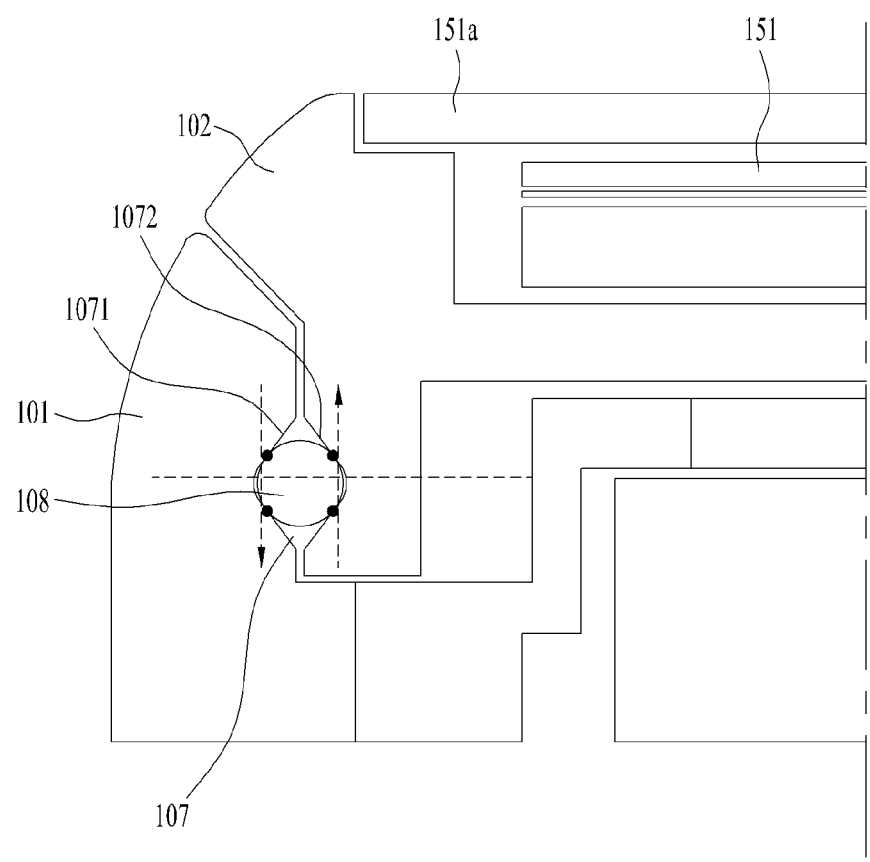
FIG. 8 is a cross-sectional view illustrating a slide bar and a rail of the mobile terminal according to the present disclosure.

FIG. 8 is a cross-sectional view illustrating a slide bar 108 and a rail 107 of the mobile terminal 100 according to the present disclosure. Referring to FIG. 8, whereas a cross-section of the slide bar 108 has a circular shape, a cross-section of the rail may have a square or diamond shape. Since the cross-sectional shape of the rail 107 is different from the cross-sectional shape of the slide bar 108, a maximum number of contact points between the rail 107 and the slide bar 108 may be set to 4 as shown in FIG. 8.

When the slide bar 108 is biased to one side or a tolerance occurs, one point of the slide bar 108 can be separated from the first or second frame, but the slide bar 108 can be kept in contact with the first frame and the second frame 102. Since there are a small number of contact points on the rail 107 of the slide bar 108, frictional force can be minimized during slide movement of the first frame and the second frame 102. The rail 107 may be implemented in a shape having many more sides than a square, but it is most preferable that the rail 108 be implemented in a square shape having a minimum number of contact points with the slide bar 108.

As can be seen from FIG. 7(*b*), after the slide bar 108 is inserted into the rail 107, the rail cap 109 is coupled to the end portion arranged in the first direction, so that the slide bar 108 can be prevented from being separated from the rail 107. For convenience of description, the rail cap 109 is coupled to the first frame 10 as shown in the attached drawings, but the scope or spirit of the present disclosure is not limited thereto. The rail cap 109 may also be coupled to the second frame 102 by covering the opened end of the rail 107.

The rail cap 109 may include a protrusion inserted into the rail 107, and may include a screw 109*b* coupled to the frame at a position where the rail cap 109 is spaced apart from the rail 107. Due to the protrusion 109*a* and the screw 109*b*, the rail cap 109 can be fixed to stably cover the end portion of the rail 107.

Figure 9:
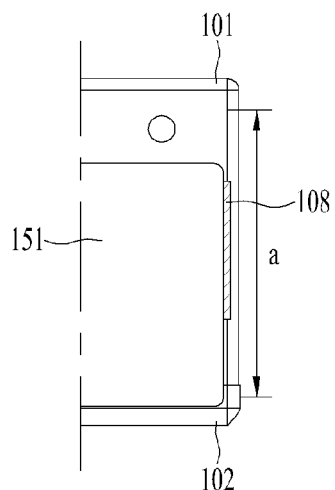
FIG. 9 is a diagram illustrating the position of a slide bar when the mobile terminal is in each of a first state and a second state.
Figure 9:
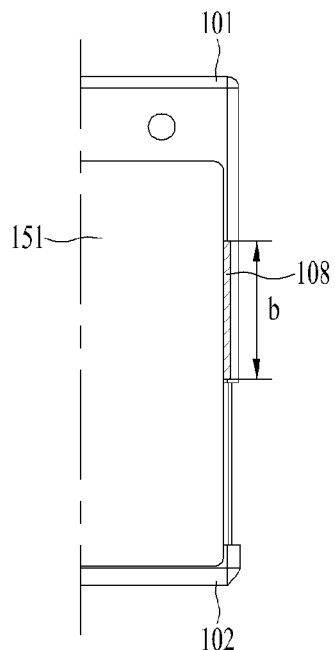

FIG. 9 is a diagram illustrating the position of a slide bar 108 when the mobile terminal 100 is in each of a first state and a second state. If the length of the slide bar 108 is too long, frictional force may increase. In contrast, if the length of the slide bar 108 is too short, fastening force between the first frame 101 and the second frame 102 becomes weak.

Referring to FIG. 9(*b*), the mobile terminal 100 may have a length corresponding to a section (b) where the first groove 1071 and the second groove 1072 overlap each other in the second state. When the slide bar 108 has a longer length than the section (b), the slide bar 108 located in a portion where the first groove 1071 and the second groove 1072 do not overlap each other in the second state does not provide substantial fastening force, only the frictional force can be added by the slide bar 108.

Referring to FIG. 9(*a*), a section (a) where the first groove 107 and the second groove 1072 overlap each other in the first state is formed to be longer so that the position of the slide bar 108 can be arbitrarily located in the section (a).

Figure 10:
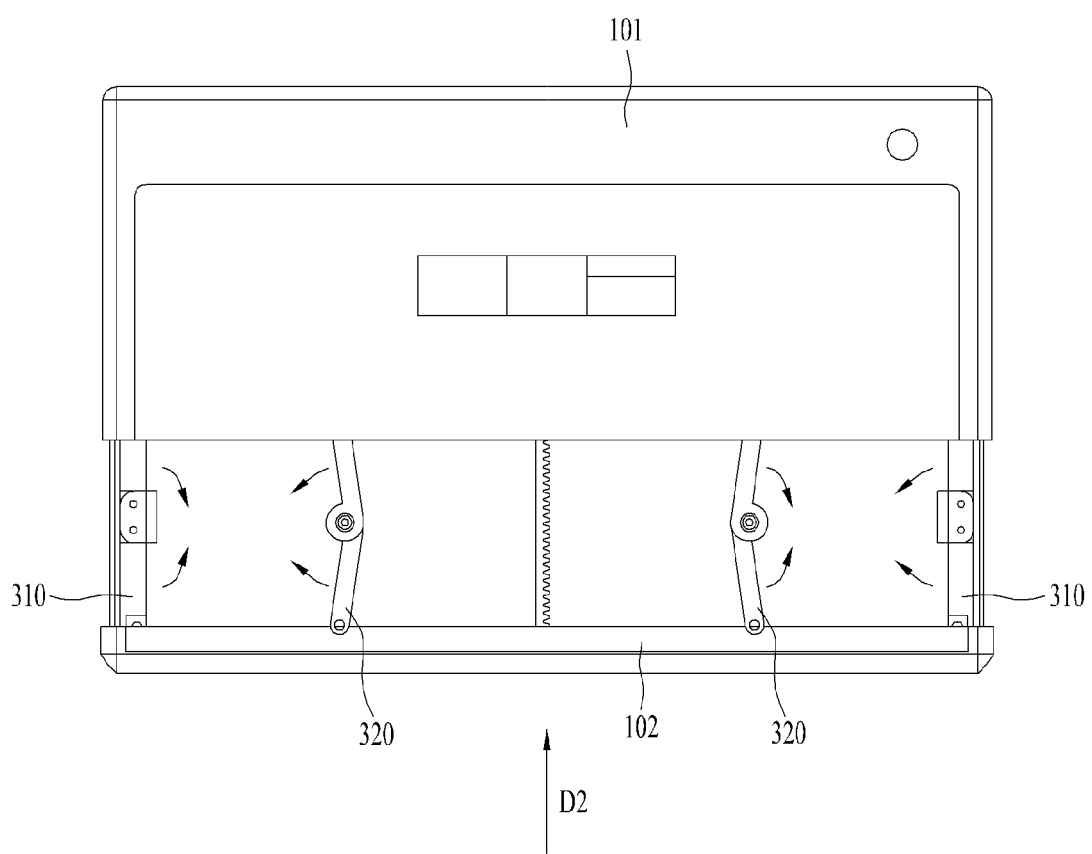
FIG. 10 is a diagram illustrating link units of a mobile terminal according to the present disclosure.

FIG. 10 is a diagram illustrating link units 310 and 320 of the mobile terminal 100 according to the present disclosure. A structure for supporting an extended portion during slide movement of the second frame 102 is required. That is, the rear surface of the portion extended by forward movement of the display unit 151 may serve as an empty space, resulting in sagging of the display unit 151. Of course, the support frame can support the rear surface of the display unit 151. However, when the mobile terminal 100 increases in size, it is difficult to support the flexible display unit 151 using only the support frame.

Accordingly, the mobile terminal 100 may include link units 310 and 320 which are folded in a first state and are unfolded in a second state so that the rear surface of the display unit 151 can be supported. Each of the link units 310 and 320 may include a first link 311, one side 311b of which is coupled to the first frame, and a second link 312, one side 312b of which is coupled to the second frame 102. The other side 311a of the first link is coupled to the other side 312a of the second link, and a hinge for changing the angle between the first link 311 and the second link 312 may be used.

The first link 311 and the second link 312 may be arranged parallel to each other in the first state. When the first state transitions to the second state, the first link 311 and the second link 312 may rotate in a manner that the angle between the first link 311 and the second link 312 can increase. Since the positions of the first frame and the second frame 102 coupled to the first link 311 and the second link 312 are fixed, the distance between the first frame and the second frame 102 is changed so that arrangement of the first link 311 and the second link 312 may be changed.

As can be seen from FIG. 10, each of the link units 310 and 320 may include one pair of first link units 310 disposed at both ends arranged in the third direction of the mobile terminal 100.

Figure 11:
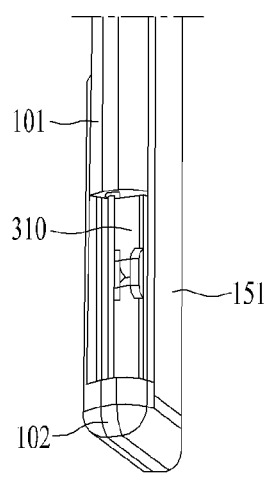
FIG. 11 is a diagram illustrating a side surface of the mobile terminal in each of a first state and a second state.
Figure 11:
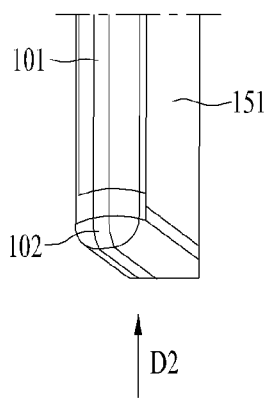

FIG. 11 is a diagram illustrating a side surface of the mobile terminal 100 in each of the first state and the second state. When the mobile terminal 100 switches to the second state, the first link unit 310 may cover both sides arranged in the third direction so that the inside of the mobile terminal 100 can be prevented from being exposed. In order to prevent the side surface of the mobile terminal 100 arranged in a third direction from being exposed in the second state as shown in FIG. 11(a), the first link 311 and the second link 312 are unfolded at 180°, and the first link unit 310 is folded to prevent the inside thereof from being exposed in the first state so that the first link unit 310 can be disposed inside the frame as shown in FIG. 11(b).

Figure 12:
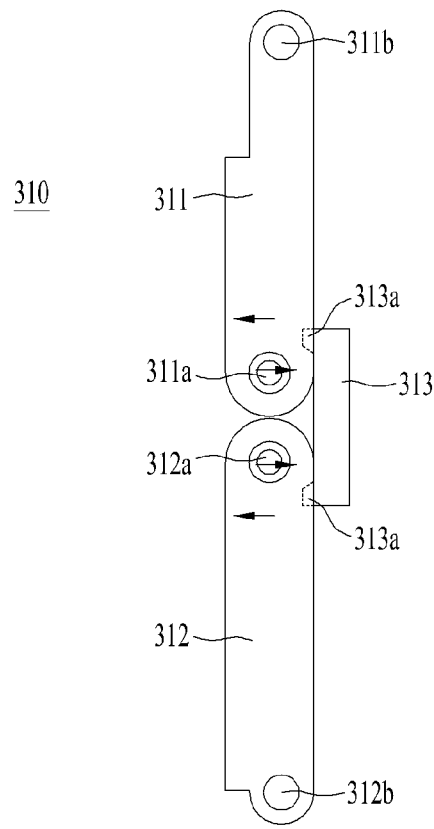
FIG. 12 is a diagram illustrating arrangement of the first link unit in each of a first state and a second state of the mobile terminal according to the present disclosure.
Figure 12:
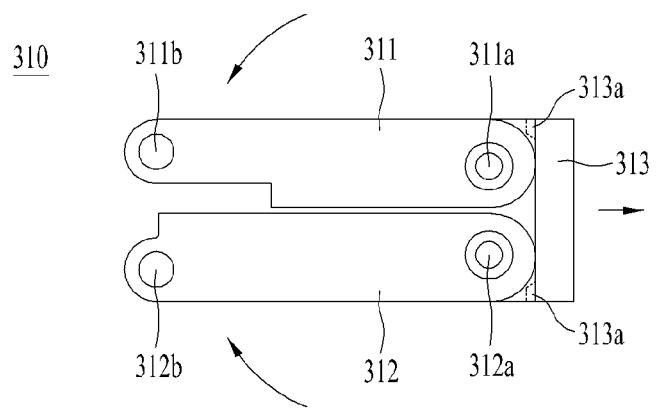

FIG. 12 is a diagram illustrating arrangement of the first link unit 310 in each of a first state and a second state of the mobile terminal 100 according to the present disclosure. FIG. 12(a) is a diagram illustrating the first link unit 310 for use in the second state, and FIG. 12(b) is a diagram illustrating the first link unit 310 for use in the first state. In the second state, the first link 311 and the second link 312 of the first link unit 310 are unfolded at 180°. In the first state, the first link 311 and the second link 312 of the first link unit 310 overlap each other and are arranged parallel to each other in the third direction.

The operation for allowing the first link 311 and the second link 312 to be unfolded at 180° during a transition mode where the first state switches to the second state can be naturally performed when the second frame 102 slidably moves in a first direction with respect to the first frame 101. In order to reduce the angle between the first link 311 and the second link 312 in a transition mode from the second state of FIG. 12(a) to the first state of FIG. 12(b), it is necessary for vertical force components to be added in a longitudinal direction of each of the first link 311 and the second link 312. When the first link 311 and the second link 312 are arranged in the same direction as the slide movement direction of the second frame 102 as shown in FIG. 12(a), force applied to the first link 311 and the second link 312 may be applied in a direction parallel to the longitudinal direction, so that the first link 311 and the second link 312 may not rotate around the hinge and may prevent slide movement in the third direction of the second frame 102.

The hinge of the mobile terminal may include elastic protrusions 313a so that the above-described problem can be solved. The hinge may include a first hinge shaft 311a formed to penetrate the other side 311a of the first link, and a second hinge shaft 312a formed to penetrate the other side 312a of the second link. As can be seen from the attached drawings, the first hinge shaft 311a and the second hinge shaft 312a are arranged in the first direction, but are arranged at the same position. That is, the first link 311 and the second link 312 may also be coupled to the hinge so that the first link 311 and the second link 312 can rotate about the same rotary shaft.

The elastic protrusions 313a may be formed at positions where the first hinge shaft 311a and the second hinge shaft 312a are spaced apart from each other by a predetermined distance. When the first link 311 and the second link 312 are arranged in the first direction while being unfolded at 1800 as shown in FIG. 12(a), the elastic protrusions 313a are pressed by the first link 311 and the second link 312. Each of the elastic protrusions 313a is deformed by receiving force, but has force to be restored to an original shape thereof. The first link 311 and the second link 312 may substantially receive force generated in a third direction due to elasticity of the elastic protrusions 313a. When the second frame 120 slidably moves in the second direction, force is applied to the first link 311 and the second link 312, the hinge moves in the right direction when viewed from the drawings, and the angle between the first link 311 and the second link 312 is reduced, resulting in transition to the state of FIG. 12(b).

Figure 13:
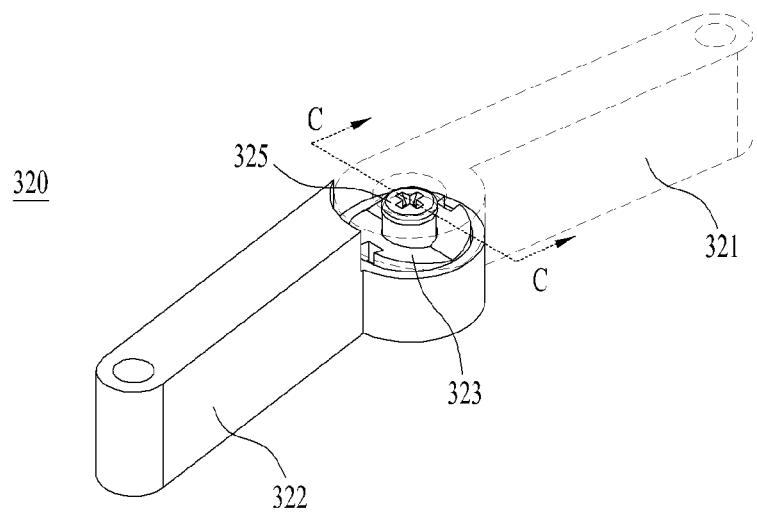
FIG. 13 is an exploded view illustrating a second link unit of the mobile terminal according to the present disclosure.
Figure 13:
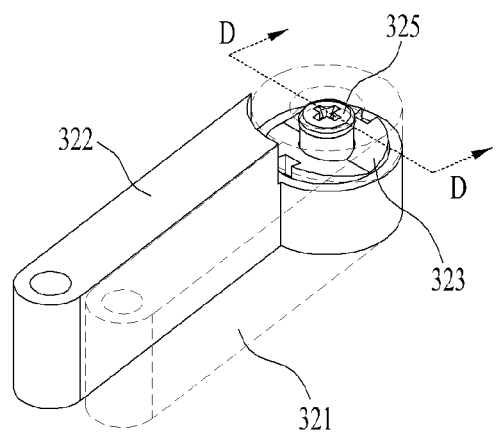

FIG. 13 is an exploded view illustrating arrangement of a second link unit 320 of the mobile terminal 100 in each of a first state and a second state according to the present disclosure. In more detail, FIG. 13(a) is a diagram illustrating arrangement of the second link 320 for use in the second state, and FIG. 13(b) is a diagram illustrating arrangement of the second link unit 320 for use in the first state.

As in the above-described embodiment, one side 321c of the first link may be rotatably coupled to the first frame 101, and one side 322c of the second link may be rotatably coupled to the second frame 102.

As can be seen from FIG. 13(a), the second link unit 320 is not completely unfolded at 180° in the second state. In a state where the second link unit 320 is unfolded at an angle smaller than 180°, the second link unit 320 may easily transition from the second state to the first state in a direction in which the angle between the first link 321 and the second link 322 of the first link 321 becomes smaller, so that the second frame 102 can smoothly move when the second link unit 320 transitions to the first state.

In the hinge of the second link unit 320, the other side 321a of the first link and the other side 322a of the second link are arranged to overlap each other in a thickness direction, so that one hinge shaft 325 may pass through the hinge of the second link unit 320. The other side 321a of the first link and the other side 322a of the second link may be formed thinner than other portions so that the other side 321a of the first link and the other side 322a of the second link may have substantially the same thickness within the second link unit 320 even when the other side 321a of the first link overlaps the other side 322a of the second link.

The second link unit 320 can provide force to naturally transition to the second state or the first state when the user provides force generated in the first or second direction to the second frame 102 over a predetermined distance. In other words, the second link unit 320 is characterized in that slide movement is possible in a semiautomatic manner, and the hinge of the second link unit 320 may include a compression spring and a cam member 323 to implement semiautomatic slide movement.

Figure 14:
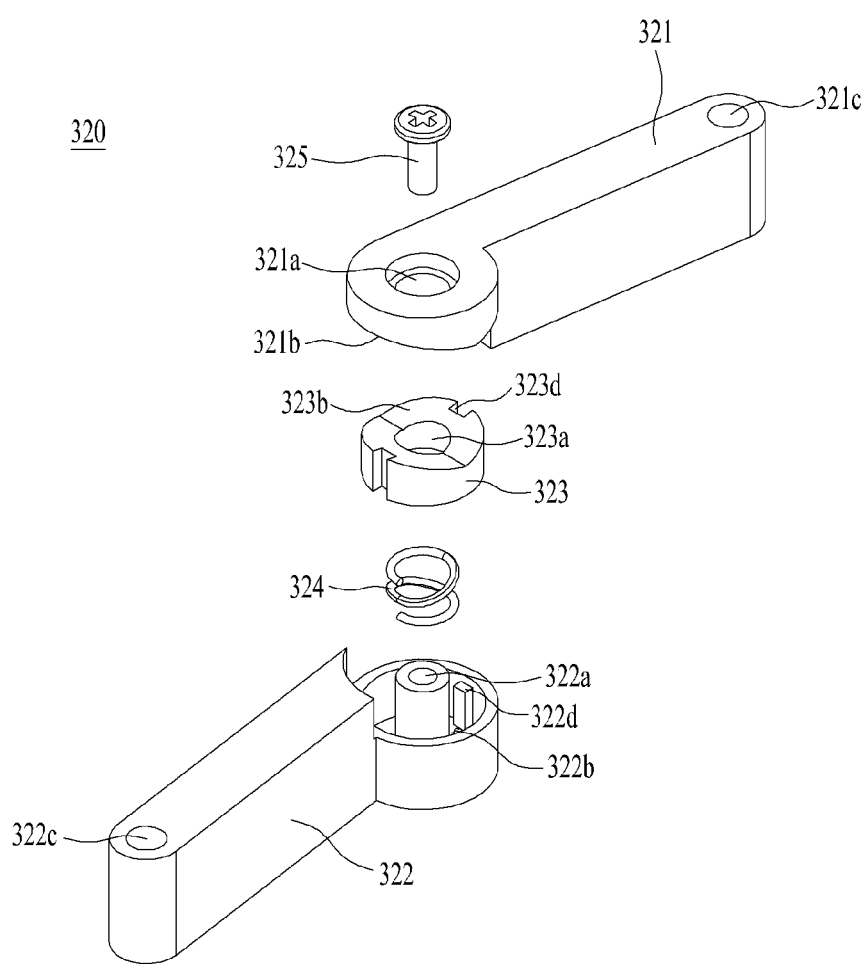
FIG. 14 is a diagram illustrating arrangement of the second link unit in each of a first state and a second state of the mobile terminal according to the present disclosure.
Figure 15:
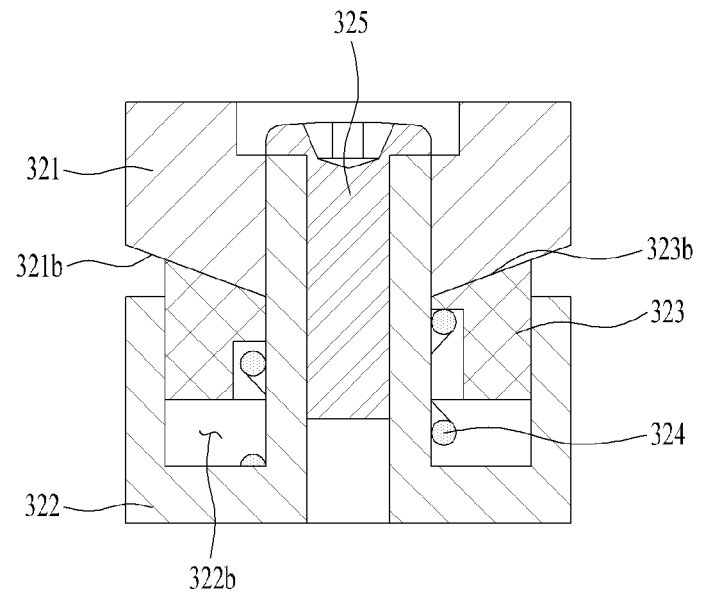
FIG. 15 is a cross-sectional view illustrating the mobile terminal taken along the line C-C or D-D shown in FIG. 14.
Figure 15:
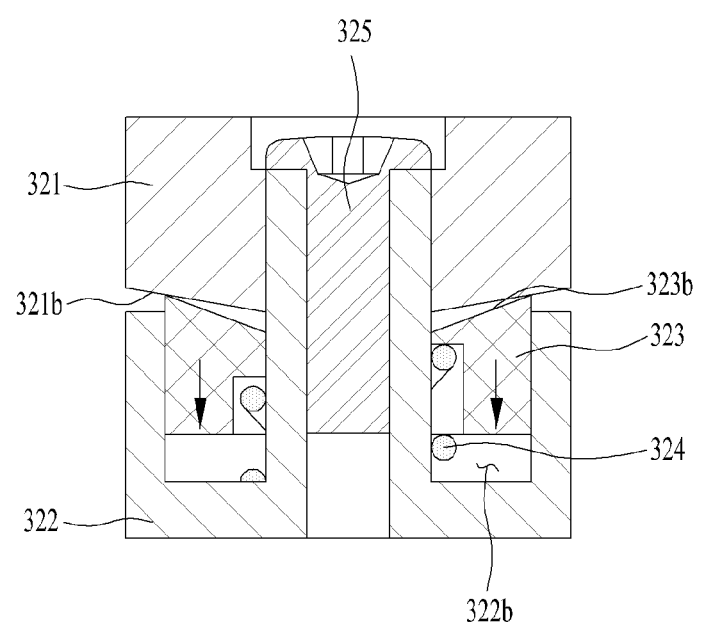

FIG. 14 is a diagram illustrating arrangement of the second link unit 322 in each of a first state and a second state of the mobile terminal 100 according to the present disclosure. FIG. 15 is a cross-sectional view illustrating the mobile terminal 100 taken along the line C-C or D-D shown in FIG. 14. The compression spring 324 may refer to a spring that contracts in length upon receiving force in the compression direction and provides elasticity in a tensile direction to recover to the original length thereof. One side of the compression spring 324 may be located at the other side 322a of the second link, and a cam member 324 may be disposed at the other side of the compression spring 324. A concave seating portion 322b may be formed at the other side of the second link such that the compression spring 324 can be accommodated therein.

The cam member 323 may move in the thickness direction within the seating portion 322b according to the compression degree of the compression spring 324, and a protrusion 322d is formed in the seating portion 322b so that the cam member 323 can move in the thickness direction without rotating with respect to the second link 322, and a groove 323d corresponding to the protrusion 322d may be formed in the cam member 323.

The compression spring 324 may provide force for pushing the cam member 323 in the other direction of the first link 321. As can be seen from FIG. 14, the cam member 323 may include a first inclined surface 323b formed symmetrically with respect to a central line crossing the hinge shaft 325, and may be formed at the other side 321a of the first link in a second inclined surface 321b corresponding to the first inclined surface 323b. As shown in the drawings, the first inclined surface 323b has a concave central portion in which the central line is located, and the second inclined surface 321b has a shape in which the central portion where the central line is located protrudes. In contrast, the first inclined surface 323b has a convex central portion, and the second inclined surface 221b has a concave central portion.

When the center line of the first inclined surface 323b and the center line of the second inclined surface 321b are identical to each other, the first inclined surface 323b and the second inclined surface 321b are in close contact with each other. When the first link 321 321 rotates and the second inclined surface 321b rotates about the second inclined surface 323b, the central line is shifted so that the cam member is pushed into the seating portion 322b of the second link 321. When the first link 321 rotates by 90°, the central line is maximally shifted so that the cam member 323 is disposed at a position farthest from the second inclined surface 321b.

The first inclined surface 323b and the second inclined surface 321b may be formed to overlap each other in an unfolded state where the first inclined surface 323b and the second inclined surface 321b are unfolded as shown in FIG. 139(a) or in a folded state where the first inclined surface 323b and the second inclined surface 321b are folded as shown in FIG. 13(b). FIG. 15(a) is a cross-sectional view of the second link taken along the line C-C shown in FIG. 13. In the following embodiment, in a state where the second link unit 320 is unfolded as shown in FIG. 13(a), the first inclined surface 323b and the second inclined surface 321b are brought into contact with each other as shown in FIG. 15(a), and a detailed description thereof will hereinafter be given.

Since the first inclined surface 323b and the second inclined surface 321b are symmetrical to each other, the first inclined surface 323b and the second inclined surface 321b may again overlap each other when the first link 321 rotates about the second link 322 and the first and second inclined surfaces 323b and 321b rotate by 180°. When the first link 321 rotates by 90°, the central line is maximally shifted so that the protruding position of the first inclined surface 323b and the protruding position of the second inclined surface 321b may overlap each other. Accordingly, the cam member 323 may press the compression spring 323 and is inserted toward the second link 322.

When the rotation angle of the first link 321 exceeds 90°, the first link 321 performs switching to the direction in which the first inclined surface 323b and the second inclined surface 321b coincide with each other, the first link 321 naturally rotates by elasticity of the compression spring 324 so that the first link 321 transitions to the state of FIG. 13(b). In contrast, when the second frame 102 is pulled in the first direction in the state of FIG. 13(b), the angle between the first link 321 and the second link 322 may increase. If each of the central line of the first inclined surface 323b and the central line of the second inclined surface 321b deviates from the shifted position of 90°, the first link 321 rotates by elasticity of the compression spring 324 so that the first link 321 may transition to the state of FIG. 13(a).

Since the second link 322 is not unfolded by 180°, the first inclined surface 323b and the second inclined surface 321b are not completely overlapped in the state of FIG. 13(b). However, after the second link 322 rotates by a predetermined angle or more, the second link 322 may automatically transition to the first state or the second state, resulting in implementation of a semiautomatic sliding structure.

However, during transition from the state of FIG. 13(a) to the other state of FIG. 13(b), it is impossible for the second link 322 to rotate by 180°, so that the first inclined surface 323b and the second inclined surface 321b may be inconsistent with each other as shown in FIG. 15(b).

Although the above-described embodiment has disclosed that the compression spring is disposed at the other side of the second link 322 and the second inclined surface 321b is formed at the other side 321a of the first link, the scope or spirit of the present disclosure is not limited thereto. If necessary, the compression spring 324 may be accommodated in the other side 321a of the first link, and the second inclined surface 321b may be formed at the other side 322a of the second link.

As described above, the mobile terminal 100 according to the present disclosure can reduce frictional force between the first frame 101 and the second frame 102 using a simple slide structure, thereby facilitating transition between the first state and the second state.

In addition, the mobile terminal 100 can support the flexible display unit 151 extended through the link units 310 and 320.

In addition, the first link unit 310 can prevent the inside of the mobile terminal 100 from being exposed in the second state, and the second link unit 320 includes the elastic member so that state transition of the mobile terminal 100 can be semiautomatically performed. It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

What is claimed is:

1. A mobile terminal comprising:
a first frame having a first side surface;
a second frame configured to slidably move, with respect to the first frame, in a first direction or in a second direction opposite to the first direction, and including a second side surface facing the first side surface; and
a slide bar disposed between the first side surface and the second side surface, and extending in the first direction,
wherein, when in a contracted state where the first frame and the second frame overlap each other, the second frame transitions to an extended state by moving in the first direction, and when in the extended state, the second frame transitions to the contracted state by moving in the second direction.

2. The mobile terminal according to claim 1, further comprising:
a first groove formed at the first side surface; and
a second groove formed at the second side surface while facing the first groove,
wherein slide bar is inserted into a rail formed by the first groove and the second groove.

3. The mobile terminal according to claim 2, wherein a shape of the first groove is symmetrical to a shape of the second groove.

4. The mobile terminal according to claim 2, wherein a cross-section of the slide bar is formed in a circular shape; and a cross-section of the rail is formed in a square shape.

5. The mobile terminal according to claim 2, wherein one pair of the first side surface and the second side surface is provided on both sides of a third direction perpendicular to the first direction.

6. The mobile terminal according to claim 2, wherein:
the first side surface is disposed more outward than the second side;
the mobile terminal further includes a rail cap configured to cover a first-directional end portion of the rail by coupling to the first frame.

7. The mobile terminal according to claim 1, wherein a length of the slide bar is shorter than a length of a first direction in which the first frame and the second frame overlap each other in the extended state.

8. The mobile terminal according to claim 1, further comprising:
a link unit disposed between the first frame and the second frame,
wherein the link unit includes:
a first link, one side of which is rotatably coupled to the first frame;
a second link, one side of which is rotatably coupled to the second frame; and
a hinge coupled to the other side of the first link and the other side of the second link, and configured to adjust an angle between the first link and the second link,
wherein the link unit enables the angle between the first link and the second link to vary depending on movement of the second frame.

9. The mobile terminal according to claim 8, wherein the link unit is constructed such that, in the contracted state, the first link and the second link are arranged parallel to a third direction perpendicular to the first direction.

10. The mobile terminal according to claim 9, wherein:
the link unit is disposed at an end portion of the third direction; and
the link unit is arranged so that an angle between the first link and the second link is set to 180°.

11. The mobile terminal according to claim 10, wherein the hinge further includes:
a first hinge shaft configured to penetrate the other side of the first link;
a second hinge shaft configured to penetrate the other side of the second link; and
one pair of elastic protrusions formed to protrude from the first hinge shaft and the second hinge shaft at positions spaced apart from each other by a predetermined distance,
wherein the one pair of elastic protrusions are in contact with the first link and the second link in the extended state.

12. The mobile terminal according to claim 9, wherein the angle between the first link and the second link is less than 180° in the extended state.

13. The mobile terminal according to claim 12,
wherein the other side of the first link and the other side of the second link are overlapped in a thickness direction,
wherein the hinge includes:
a hinge shaft configured to penetrate the other side of the first link and the other side of the second link;
a compression spring disposed at the other side of the second link, and configured to apply force in a direction of the hinge shaft; and
a cam member disposed at an end portion of the compression spring, and configured to include a first inclined surface formed on a surface facing the overlapped first link,
wherein another end of the first link includes a second inclined surface corresponding to the first inclined surface.

14. The mobile terminal according to claim 13, wherein when the compression spring transitions from the contracted state to the extended state, and when the compression spring transitions from the extended state to the contracted state, the compression spring is compressed and expanded, respectively.

15. The mobile terminal according to claim 13, wherein the first inclined surface and the second inclined surface are horizontally symmetrical to each other with respect to a central line passing through the hinge shaft.

* * * * *